(12) United States Patent
Dunn et al.

(10) Patent No.: US 7,587,992 B2
(45) Date of Patent: Sep. 15, 2009

(54) SHEDDING BLADE WITH ADJUSTABLE BLADE LENGTH

(75) Inventors: Steven B. Dunn, Beverly Hills, CA (US); Bryce D. Fujii, Canoga Park, CA (US); Kevin C. Clark, Los Angeles, CA (US)

(73) Assignee: Munchkin, Inc., North Hills, CA (US)

( * ) Notice: Subject to any disclaimer, the term of this patent is extended or adjusted under 35 U.S.C. 154(b) by 738 days.

(21) Appl. No.: 10/408,028

(22) Filed: Apr. 4, 2003

(65) Prior Publication Data

US 2004/0194729 A1    Oct. 7, 2004

(51) Int. Cl.
*A01K 13/00* (2006.01)
(52) U.S. Cl. ...................... 119/631; 119/633
(58) Field of Classification Search ................ 119/618, 119/619, 631, 625, 611, 626, 627, 628, 629, 119/633; 452/102, 103, 104
See application file for complete search history.

(56) References Cited

U.S. PATENT DOCUMENTS

| | | | |
|---|---|---|---|
| 348,067 A * | 8/1886 | Spear ......................... 119/631 |
| 1,409,855 A * | 3/1922 | Hendrickson ............... 119/627 |
| 1,930,977 A | 10/1933 | Kirch |
| 2,156,416 A * | 5/1939 | Wikander .................... 119/626 |
| 2,800,879 A | 7/1957 | Quick |
| 3,491,747 A * | 1/1970 | Robinson .................... 600/570 |
| 3,762,045 A * | 10/1973 | Fitzpatrick, Jr. .............. 30/40.1 |
| 3,835,859 A * | 9/1974 | Roberts et al. ................ 606/79 |
| 3,981,275 A * | 9/1976 | Schimoler .................... 119/610 |
| 4,046,109 A * | 9/1977 | Miller et al. ................. 119/631 |
| 4,047,504 A * | 9/1977 | Borba et al. ................. 119/631 |
| 4,198,928 A * | 4/1980 | Borba ......................... 119/631 |
| 4,245,653 A * | 1/1981 | Weaver ....................... 600/563 |
| 4,574,416 A * | 3/1986 | Stewart et al. ................. 15/169 |
| 4,799,457 A * | 1/1989 | Gordon ....................... 119/631 |
| 5,092,345 A * | 3/1992 | Sakita ......................... 600/570 |
| 5,584,123 A * | 12/1996 | Chi .............................. 30/125 |
| 5,895,353 A * | 4/1999 | Lunsford et al. ............. 600/209 |
| D418,036 S * | 12/1999 | Shearer ........................ D8/98 |
| 6,006,433 A * | 12/1999 | Baltazar ....................... 30/162 |
| 6,015,419 A * | 1/2000 | Strome et al. ................ 606/167 |
| 6,363,614 B1 * | 4/2002 | Umstead et al. ............... 30/144 |
| 6,427,633 B1 * | 8/2002 | Ogden ......................... 119/628 |
| 6,679,851 B2 * | 1/2004 | Burbank et al. ............. 600/564 |
| 2002/0073930 A1 * | 6/2002 | Kan ............................ 119/631 |

FOREIGN PATENT DOCUMENTS

| | | | |
|---|---|---|---|
| DE | 3518554 | * | 1/1986 |
| FR | 2694486 | * | 2/1994 |
| GB | 2230685 | * | 10/1990 |
| GB | 2300342 A | * | 11/1996 |
| JP | 2001-68 | * | 1/2001 |

* cited by examiner

*Primary Examiner*—David J Parsley
(74) *Attorney, Agent, or Firm*—Knoble Yoshida & Dunleavy, LLC

(57) ABSTRACT

An article for removing dead hair from animals includes a handle and a shedding blade that is attached to the handle. The shedding blade includes a flexible, elongated member having at least one serrated edge. Advantageously, structure is provided to permit adjustment of the length of the shedding blade. This permits a consumer to select the proper blade size for the animal that is being groomed. Additionally, the article is constructed and arranged so that the flexible, elongated member may be at least partially retracted into the handle for storage purposes.

30 Claims, 5 Drawing Sheets

US 7,587,992 B2

SHEDDING BLADE WITH ADJUSTABLE BLADE LENGTH

BACKGROUND OF THE INVENTION

1. Field of the Invention

This invention relates generally to the field of pet care and grooming. More specifically, this invention relates to shedding blades, which are implements that are used to remove dead hair from animals.

2. Description of the Related Technology

Shedding blades are used to remove dead or loose hair from animals, particularly animals, such as long-haired dogs, that periodically shed their hair. These grooming tools most commonly feature a stationary blade that is looped into a handle. Shedding blades are available in different sizes and shapes for grooming different types of animals and animals of different sizes.

Many of the shedding blades that are commercially available include a handle that can be separated into two halves to create a single blade length that can either be used as a straight blade or as a looped blade when the two handle halves are reconnected. The blades on these implements are commonly available with both edges featuring serrated teeth or a single toothed edge with an opposing non-toothed edge. In the latter case, the non-toothed edge can be used like a squeegee for removing water after a bath.

It is well known that a large percentage of pet owners have more than one pet, and often pets of different species and or different sizes. For example, according to a 2001-2002 APPMA National Pet Owners Survey, 48% of cat owners also own a dog, and 42% of dog owners also own a cat. Such pet owners as well as pet grooming facilities will typically need to purchase and use more than one shedding blade. The need to purchase, store, clean and maintain different implements for essentially the same purpose on different pets is expensive, space consuming and cumbersome. A need exists for a single article that can optimally remove dead hair from animals of different sizes and different species, and that minimizes the need for storage space when it is not in use.

SUMMARY OF THE INVENTION

Accordingly, it is an object of the invention to provide a single article that can optimally remove dead hair from animals of different sizes and different species, and that minimizes the need for storage space when it is not in use.

In order to achieve the above and other objects of the invention, an article for removing dead hair from animals according to a first aspect of the invention includes a handle, a shedding blade attached to the handle, the shedding blade comprising a flexible, elongated member having at least one serrated edge, and adjustment structure for adjusting a length of the shedding blade.

According to a second aspect of the invention, an article for removing dead hair from animals includes a handle, a shedding blade attached to the handle, the shedding blade comprising a flexible, elongated member having at least one serrated edge, and retracting structure for retracting at least a portion of the shedding blade into the handle.

These and various other advantages and features of novelty that characterize the invention are pointed out with particularity in the claims annexed hereto and forming a part hereof.

However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
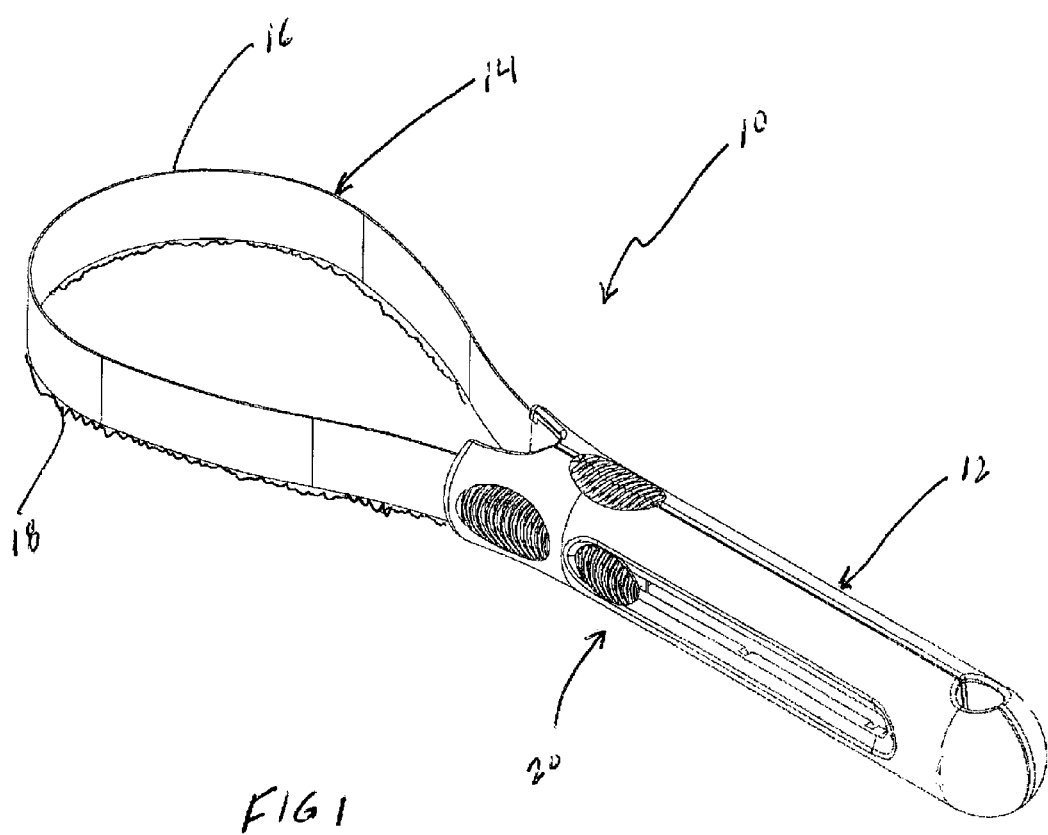
FIG. 1 is a perspective view depicting an article that is constructed according to a preferred embodiment of the invention.
Figure 3:
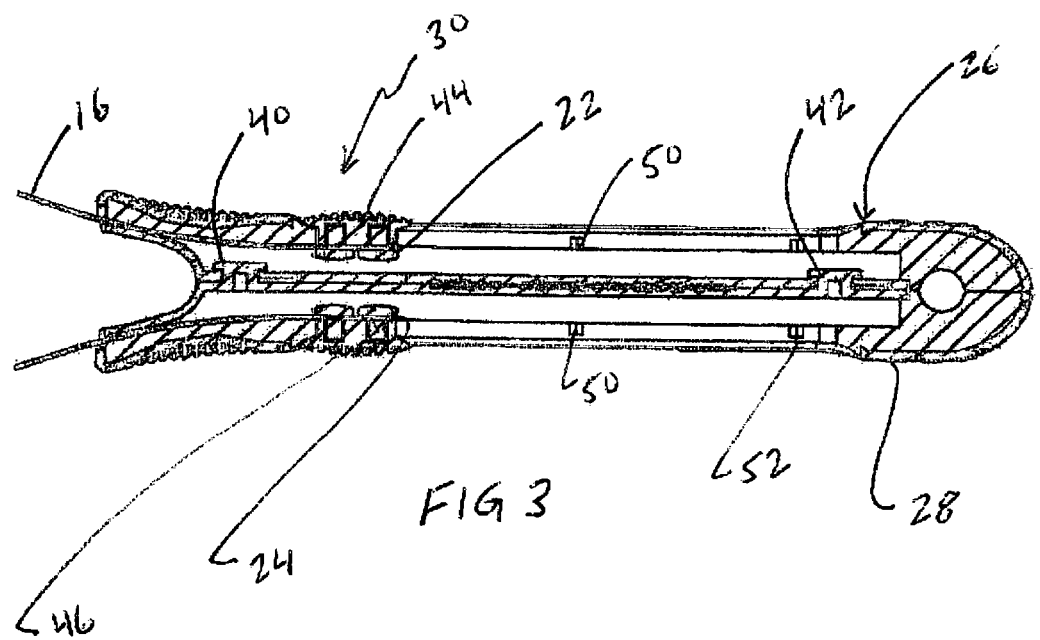
FIG. 3 is a cross-sectional view taken along lines 3-3 in FIG. 2.
Figure 4:
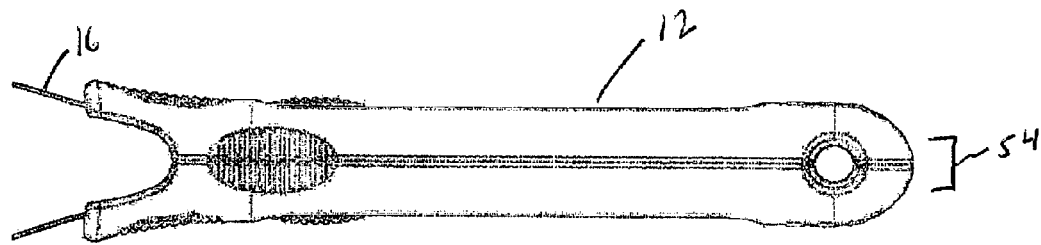
FIG. 4 is a second side elevational view of the article that is shown in FIG. 1.

Referring now to the drawings, wherein like reference numerals designate corresponding structure throughout the views, and referring in particular to FIG. 1, an article 10 for removing dead hair from animals according to a preferred embodiment of the invention includes a handle 12 and a shedding blade 14 that is attached to the handle 12. Shedding blade 14 includes a flexible elongated member 16 that has at least one serrated edge 18 that is designed to remove dead hair from animals. Flexibly elongated member 16 is preferably fabricated from a metallic material such as steel. The flexible elongated member 16 is configured as a loop, with first and second ends 22, 24 thereof being positioned within the handle 12, as is best shown in FIG. 3.

Figure 5:
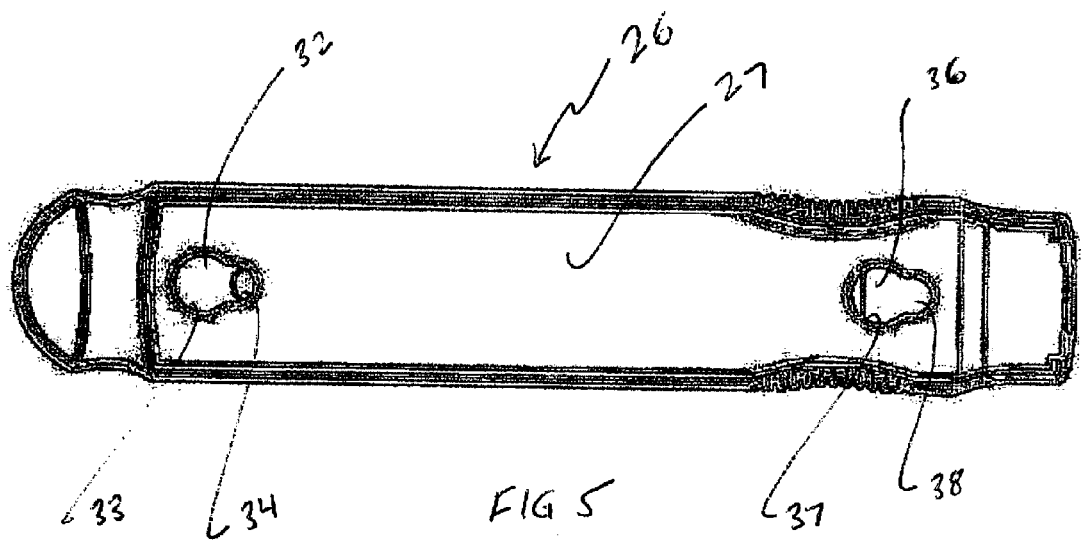
FIG. 5 is an elevational view of one component of the article that is shown in FIG. 1.
Figure 6:
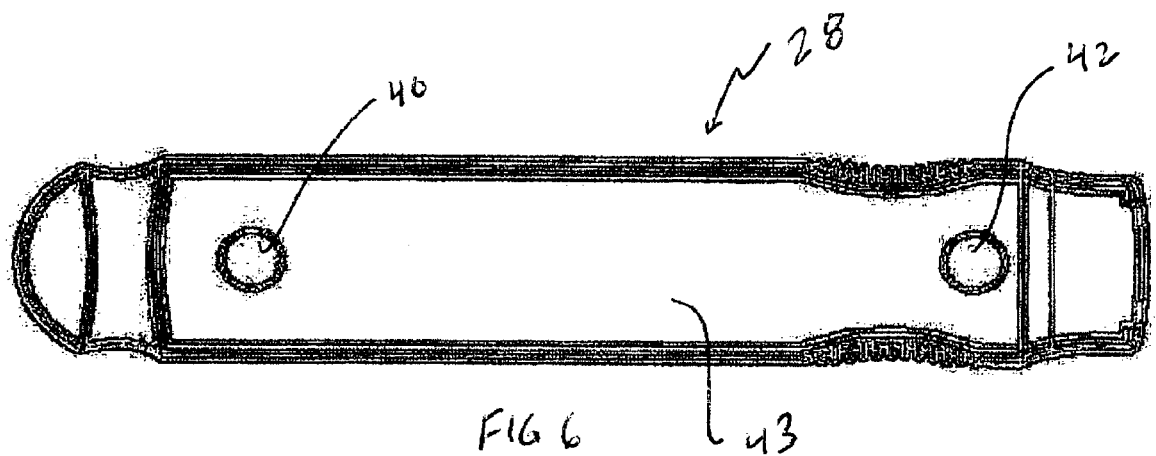
FIG. 6 is an elevational view of another component of the article that is shown in FIG. 1.

Handle 12 is advantageously separable into a first handle portion 26, which is separately depicted in FIG. 5, and a second handle portion 28, which is shown in FIG. 6. Referring briefly to FIG. 5, it will be seen that an inner surface 27 of the first handle portion 26 includes a first recess 32 having a circular opening 33 and a retention channel 34 that is contiguous with and more narrow then the circular opening 33. Similarly, inner surface 27 includes a second recess 36 having a circular opening 37 and a retention channel 38 that is contiguous with and more narrow than the circular opening 37. Looking now to FIGS. 3 and 6, it will be seen that an inner surface 43 of the second handle portion 28 includes first and second mushroom shaped beads 40, 42 that are constructed and shaped so as to respectively fit within the recesses 32, 36 that are defined in the inner surface 27 of the first handle portion 26. More specifically, the beads 40, 42 are shaped to respectively be inserted within the circular openings 33, 37 and to then fit securely within the retention channels 34, 38 when the first and second handle portions 26, 28 are slightly longitudinally displaced from each other by a user. As may be seen in FIG. 3, the mushroom shaped heads of the beads 40, 42 will be locked within the retention channels 34, 38 so as to prevent separation of the first and second handle portions 26, 28. In order to separate the first and second handle portions 26, 28, a user will have to again longitudinally displace the handle portions 26, 28 in order to align the beads 40, 42 with the circular openings 33, 37.

Figure 2:
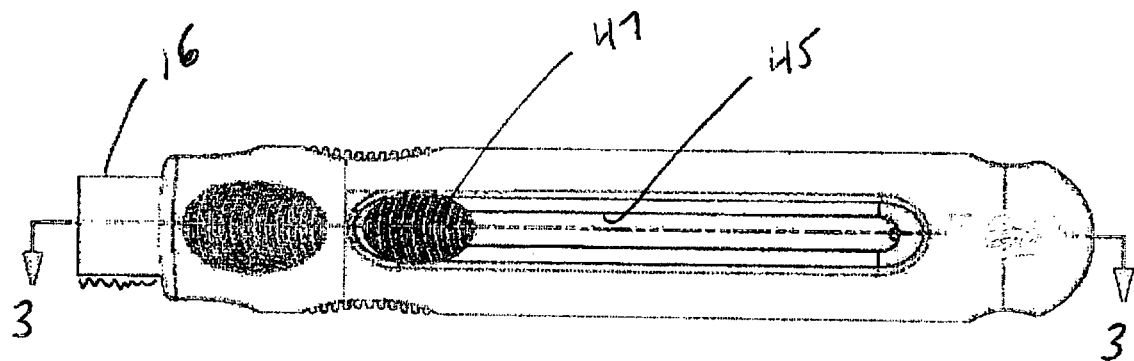
FIG. 2 is a fragmentary side elevational view of the article that is shown in FIG. 1.
Figure 7:
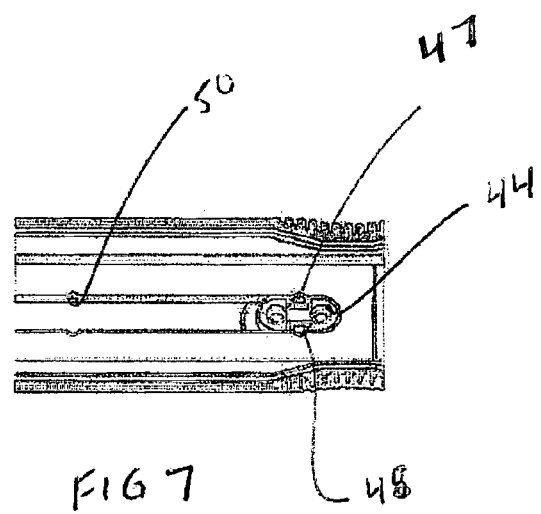
FIG. 7 is a fragmentary view of a portion of the article that is shown in FIG. 1.
Figure 8:
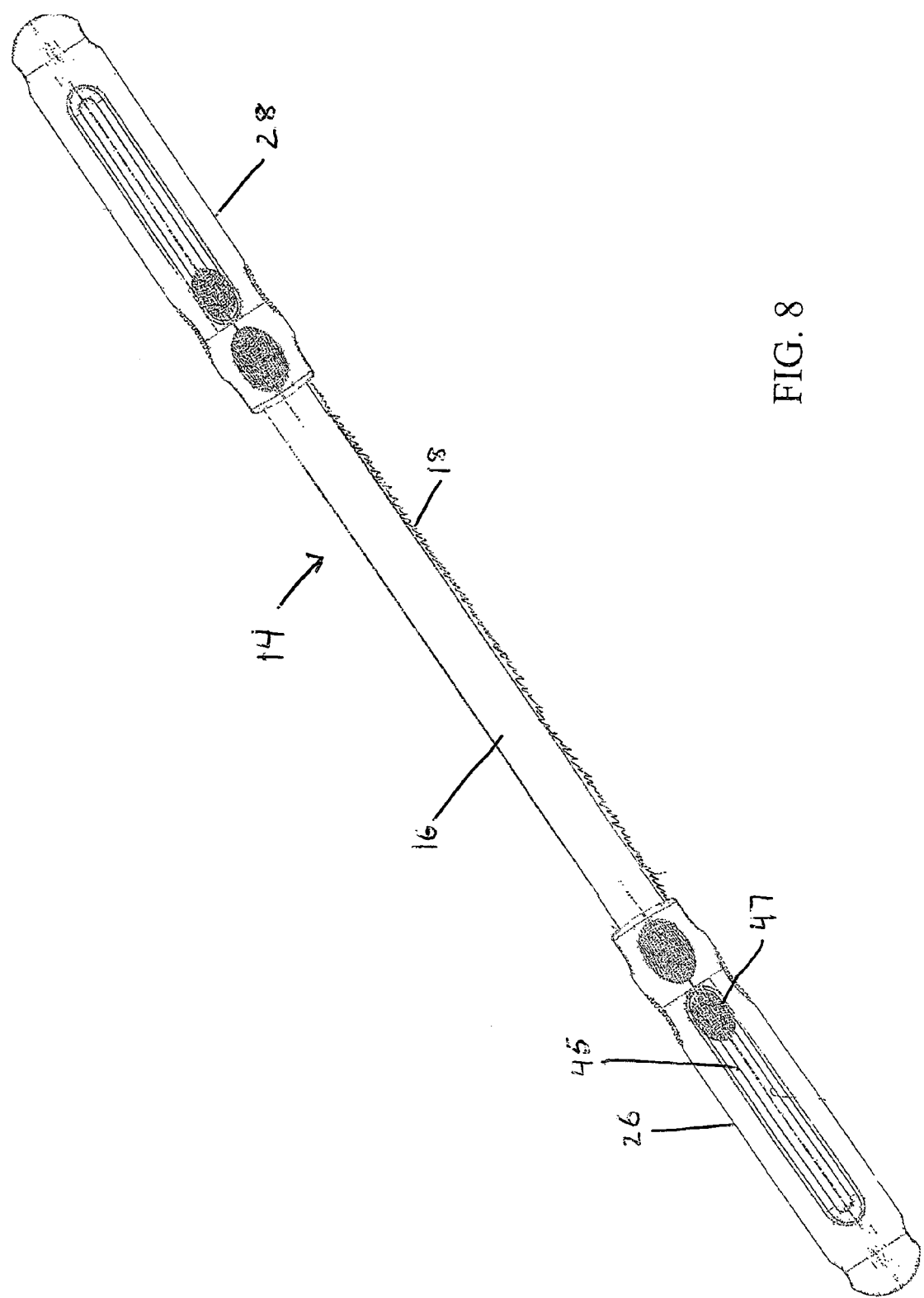
FIG. 8 is an elevational view of the shown in FIG. 1 in an elongated position.

According to one advantageous feature of the invention, retracting structure 30 is provided for retracting at least a portion of the flexible elongated member 16 into the handle 12. The retracting structure 30 is preferably constructed and arranged to permit a consumer to adjust the length of the shedding blade 14 to at least two predetermined positions. In the preferred embodiment, retracting structure 30 is constructed and arranged to permit the length of the shedding blade 14 to be adjusted to an infinite number of positions, with three different preset positions being mechanically defined, as will be described in greater detail below. As may be seen in FIGS. 2 and 3, first and second control elements 44, 46 are mounted for linear longitudinal movement within the handle 12, with the first control element 44 being mounted for movement within a longitudinal channel 45 that is defined within the first handle portion 26 in the second control element 46 similarly being mounted for a longitudinal movement within a channel that is defined within the second handle portion 28. Referring briefly to FIG. 7, it will be seen that each of the control elements 44, 46 includes a pair of outwardly extending spring biased retention fingers 47, 48 that simultaneously retain the control element 44, 46 within its respective channel and further act to engage one of three pairs of detents that are defined within the channel and that define specific preset positions for the control element 44, 46. As may be seen in FIG. 3, the control elements 44, 46 are depicted as being positioned in one of those preset positions, which corresponds to a fully extended adjustment position for the shedding blade 14 that is appropriate for grooming large animals. Preferably, each position is identified with indicia as being appropriate for a specific grooming use. For example, one position may be identified as being appropriate for grooming a cat, another for a dog, or another for a horse. Alternatively, one position may be identified as being appropriate for grooming a small animal, another for an animal of moderate size, and the last for a large animal.

Alternatively, the shedding blade 14 may be retracted by slightly squeezing and pulling the control elements 44, 46 so that the retention fingers 47, 48 will be positioned within a second pair of detents 50, which corresponds to an intermediate adjustment position for the shedding blade 14 that is appropriate for grooming smaller animals. As yet another alternative, the shedding blade 14 may be repositioned so that the retention fingers 47, 48 are positioned within a third pair 52 of detents that correspond to a fully retracted position for the shedding blade 14. This fully retracted position is appropriate for grooming the smallest pets as well as for minimizing the outer dimensions of the article 10 when it is desired to store the article 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An article for removing dead hair from animals, comprising:
    a handle, wherein said handle is separable into at least a first portion and a second portion;
    a shedding blade attached to the handle, said shedding blade comprising a flexible, elongated member having at least one serrated edge;
    adjustment means for adjusting a length of said shedding blade with respect to said handle while said shedding blade is configured as a loop and the first portion and the second portion of the handle are not separated and are adjacent to each other along a longitudinal axis of the handle; and
    wherein said adjustment means comprises a first control element that is longitudinally movable within a first longitudinal channel disposed in an exterior surface of the first portion of the handle and a second control element that is longitudinally movable within a second longitudinal channel disposed in an exterior surface of the second portion of the handle by a consumer in order to adjust the length of the shedding blade.

2. An article for removing dead hair from animals according to claim 1, wherein said flexible, elongated member is fabricated from a metallic material.

3. An article for removing dead hair from animals according to claim 1, wherein a first end and a second end of said flexible, elongated member are positioned within said handle.

4. An article for removing dead hair from animals according to claim 3, wherein said first portion is attached to said first end of said flexible, elongated member and said second portion is attached to said second end of said flexible, elongated member, whereby said shedding blade may be unconfigured from a loop into an elongated tool.

5. An article for removing dead hair from animals according to claim 1, wherein said adjustment means retracts at least a portion of said flexible, elongated member into said handle.

6. An article for removing dead hair from animals according to claim 5, wherein said adjustment means is constructed and arranged to permit a consumer to adjust the length of said shedding blade to at least two predetermined positions.

7. An article for removing dead hair from animals according to claim 6, wherein said adjustment means is constructed and arranged to permit a consumer to adjust the length of said shedding blade to at least three predetermined positions.

8. An article for removing dead hair from animals according to claim 6, wherein said adjustment means is constructed and arranged to permit a consumer to adjust the length of said shedding blade to at least two positions that are identified as being for different species of animals.

9. An article for removing dead hair from animals according to claim 6, wherein said adjustment means is constructed and arranged to permit a consumer to adjust the length of said shedding blade to at least two positions that are identified as being for different sizes of animals.

10. An article for removing dead hair from animals according to claim 1, further comprising preset means for defining specific preset positions for at least one of said first control element and the second control element.

11. An article for removing dead hair from animals, comprising:
    a handle, wherein said handle is separable into at least a first portion and a second portion;
    a shedding blade attached to the handle, said shedding blade comprising a flexible, elongated member having at least one serrated edge;
    retracting means for retracting at least a portion of said shedding blade substantially longitudinally into said handle while said shedding blade is configured as a loop and the first portion and the second portion of the handle are not separated and are adjacent to each other along a longitudinal axis of the handle; and
    wherein said retracting means comprises a first control element that is longitudinally movable within a first longitudinal channel disposed in an exterior surface of the first portion of the handle and a second control element that is longitudinally movable within a second longitudinal channel disposed in an exterior surface of the second portion of the handle by a consumer in order to adjust the length of the shedding blade.

12. An article for removing dead hair from animals according to claim 11, wherein said flexible, elongated member is fabricated from a metallic material.

13. An article for removing dead hair from animals according to claim 11, wherein a first end and a second end of said flexible, elongated member are positioned within said handle.

14. An article for removing dead hair from animals according to claim 13, wherein said first portion is attached to said first end of said flexible, elongated member and said second portion is attached to said second end of said flexible, elongated member, whereby said shedding blade may be unconfigured from a loop into an elongated tool.

15. An article for removing dead hair from animals according to claim 11, wherein said retracting means is constructed and arranged to permit a consumer to adjust the length of said shedding blade to at least two predetermined positions.

16. An article for removing dead hair from animals according to claim 11, wherein said retracting means is constructed and arranged to permit a consumer to retract the shedding blade to at least three predetermined positions.

17. An article for removing dead hair from animals according to claim 11, further comprising preset means for defining specific preset positions for at least one of said first control element and the second control element.

18. An article for removing dead hair from animals according to claim 15, wherein said retracting means is constructed and arranged to permit a consumer to adjust the length of said shedding blade to at least two positions that are identified as being for different species of animals.

19. An article for removing dead hair from animals according to claim 15, wherein said retracting means is constructed and arranged to permit a consumer to adjust the length of said shedding blade to at least two positions that are identified as being for different sizes of animals.

20. An article for removing dead hair from animals, comprising:
    a handle, wherein said handle is separable into at least a first portion and a second portion, wherein the first portion and the second portion each have longitudinal channels disposed in exterior surfaces of the first portion and the second portion;
    a shedding blade attached to the handle, said shedding blade comprising a flexible, elongated member having at least one serrated edge; and
    retracting means for retracting at least a portion of said shedding blade into said handle while said shedding blade is in a loop configuration and the first portion and the second portion of the handle are not separated and are adjacent to each other along a longitudinal axis of the handle, said retracting means comprising control elements located within the longitudinal channels and the control elements are longitudinally movable by a consumer in order to retract the shedding blade.

21. An article for removing dead hair from animals according to claim 20, further comprising preset means for defining specific preset positions for said control element.

22. An article for removing dead hair from animals, comprising:
    a handle, wherein said handle is separable into at least a first portion and a second portion, wherein the first portion and the second portion each have longitudinal channels disposed in exterior surfaces of the first portion and the second portion;
    a shedding blade, said shedding blade comprising a flexible, elongated member having at least one serrated edge, said shedding blade further being oriented in a loop and having first and second end portions that are both movably attached to the handle; and
    adjustment means for longitudinally adjusting a position of said first and second end portions with respect to said handle while said shedding blade remains in said loop orientation and while the first portion and the second portion of the handle are not separated and are adjacent to each other along a longitudinal axis of the handle in order to adjust a length of said shedding blade; wherein the adjustment means includes control elements that are longitudinally movable within the longitudinal channels in order to adjust the length of the shedding blade.

23. An article for removing dead hair from animals according to claim 22, wherein said adjustment means comprises retracting means for retracting at least a portion of said flexible, elongated member into said handle.

24. An article for removing dead hair from animals according to claim 22, wherein said adjustment means is constructed and arranged to permit a consumer to adjust the length of said shedding blade to at least two predetermined positions.

25. An article for removing dead hair from animals according to claim 24, wherein said adjustment means is constructed and arranged to permit a consumer to adjust the length of said shedding blade to at least three predetermined positions.

26. An article for removing dead hair from animals according to claim 24, wherein said adjustment means is constructed and arranged to permit a consumer to adjust the length of said shedding blade to at least two positions that are identified as being for different species of animals.

27. An article for removing dead hair from animals according to claim 22, further comprising preset means for defining specific preset positions for said control elements.

28. An article for removing dead hair from animals, comprising:
    a handle, wherein said handle is separable into at least a first portion and a second portion, wherein the first portion and the second portion each have longitudinal channels disposed in exterior surfaces of the first portion and the second portion;
    a first control element movably mounted within said longitudinal channel of the first portion and a second control element movably mounted within the longitudinal channel of the second portion of the handle;
    a shedding blade attached to the handle, said shedding blade comprising a flexible, elongated member having at least one serrated edge; and
    wherein when the shedding blade is in a loop orientation and the first portion and the second portion of the handle are not separated and are adjacent to each other along a longitudinal axis of the handle, the first and second control elements adjust a length of said shedding blade with respect to said handle in response to movement of said first and second control elements.

29. An article for removing dead hair from animals according to claim 28, wherein at least one of said first control element and the second control element is mounted for linear movement with respect to said handle.

30. An article for removing dead hair from animals according to claim 29, further comprising preset means for defining specific preset positions for at least one of said first control and the second control element.

* * * * *